Aug. 21, 1945.  J. L. HIPPLE  2,383,386
AGRICULTURAL IMPLEMENT
Filed March 29, 1943   2 Sheets-Sheet 1
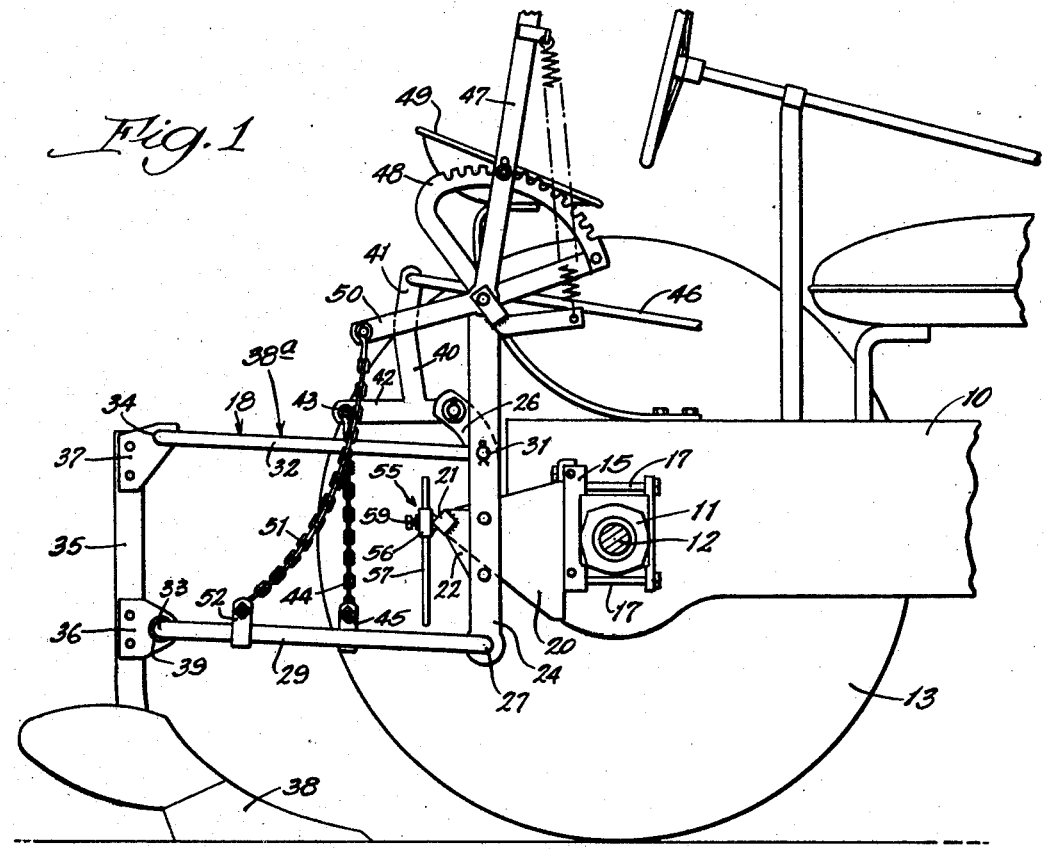
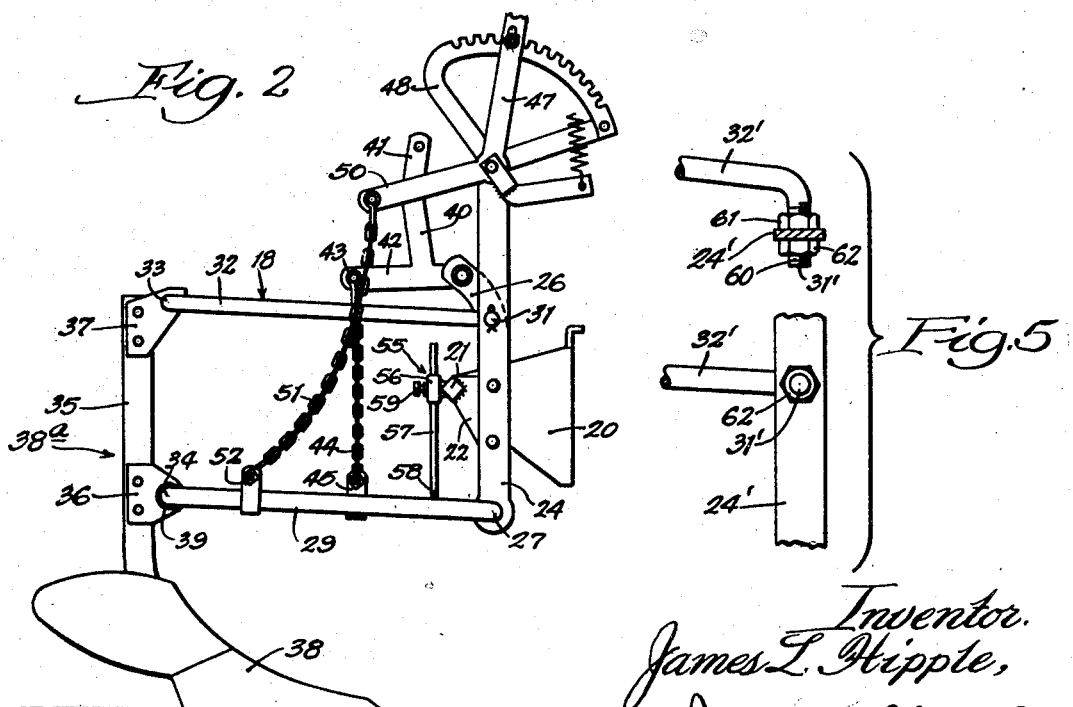
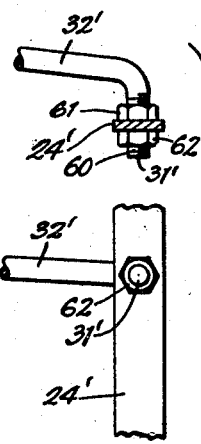
Inventor.
James L. Hipple,
By Paul O. Pippel
Attorney.

Aug. 21, 1945.  J. L. HIPPLE  2,383,386
AGRICULTURAL IMPLEMENT
Filed March 29, 1943   2 Sheets-Sheet 2
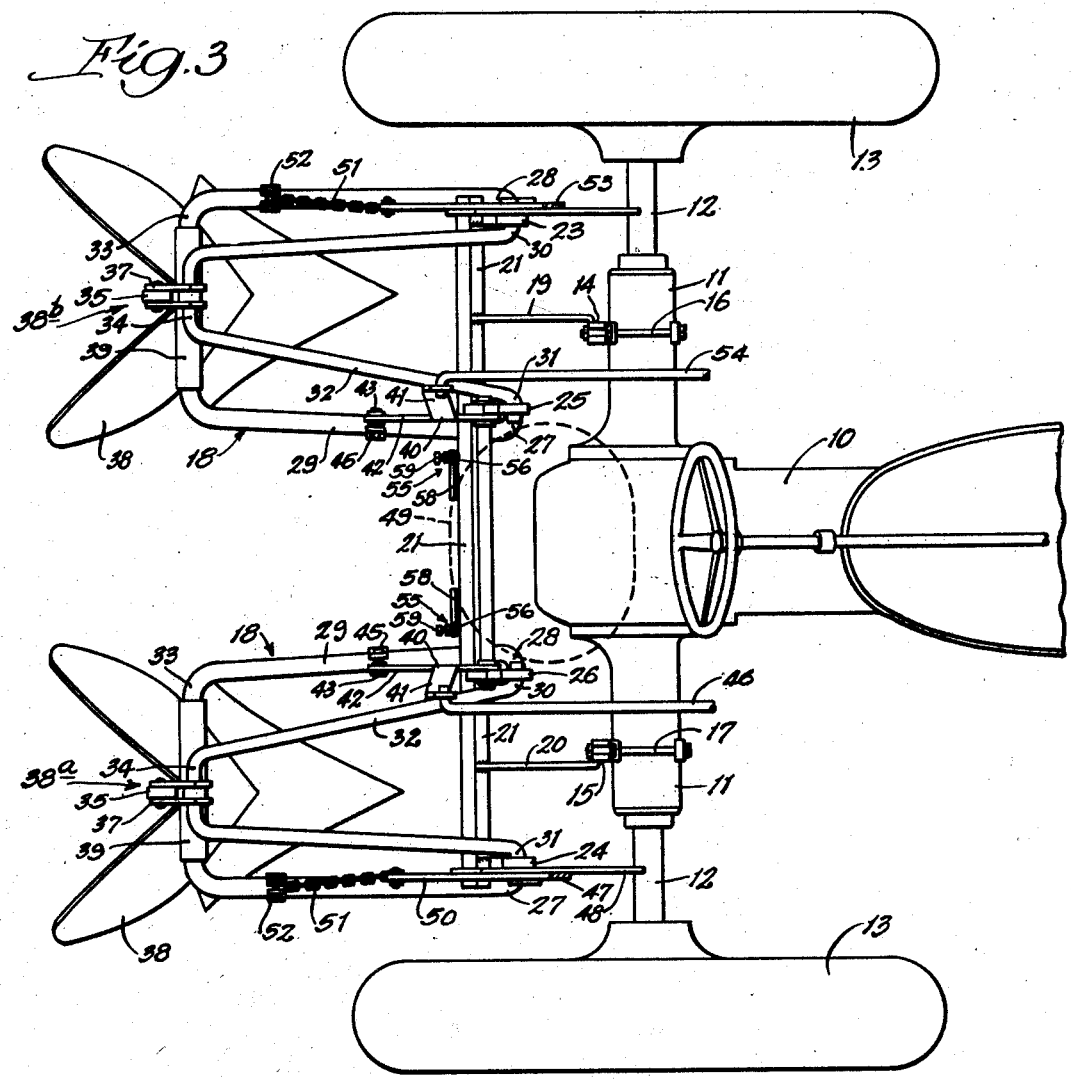
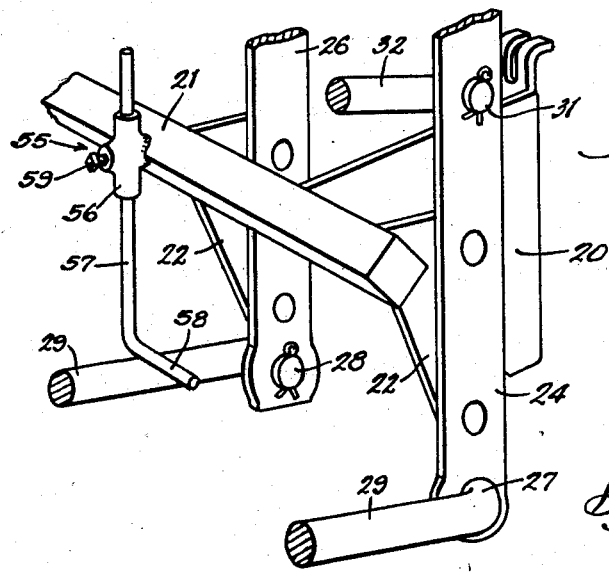
Inventor:
James L. Hipple,
By Paul O. Pippel
Attorney.

Patented Aug. 21, 1945

2,383,386

UNITED STATES PATENT OFFICE 2,383,386

AGRICULTURAL IMPLEMENT

James L. Hipple, Canton, Ill., assignor to International Harvester Company, a corporation of New Jersey Application March 29, 1943, Serial No. 480,885

1 Claim. (Cl. 97—47)

This invention relates to agricultural implements and, more particularly, to self-supporting implements adapted to be attached to a tractor or other support and to be drawn thereby.

An important object of the invention is to provide an implement which is self-supporting when detached from a tractor.

Another object is to provide a self-supporting implement having one or more hitch points for attachment to a tractor or other support, which hitch points, when the implement is detached from the tractor, occupy substantially the same position with respect to the ground as they occupy when attached to the tractor.

A further object is to provide a self-supporting agricultural implement adapted for attachment to a tractor, wherein the only contact with the ground is provided by the earth-working tool.

Still another object is the provision of an agricultural implement adapted for attachment to a tractor and including a working tool and generally parallel bails pivoted on the tractor, and means for maintaining the same angular relationship of bails to working tool when the implement is detached from the tractor as when it is attached thereto.

These and other objects will become apparent from the following detailed description when read in conjunction with the accompanying drawings, wherein:

Figure 1 is a view in elevation of the rear end of a tractor, with one wheel removed, and showing an implement incorporating the features of the present invention connected thereto;

Figure 2 is an elevation of the implement shown in Figure 1 detached from the tractor;

Figure 3 is a plan view of the rear end of the tractor with a two-bottom plow embodying the features of the present invention connected thereto;

Figure 4 is a detail view in perspective of a portion of the apparatus shown in Figures 1 and 2; and Figure 5 is a modified form of apparatus employed for rendering the implement self-supporting.

In the drawings, the numeral 10 designates the body portion of a tractor having a transverse rear axle structure 11 journaling a rear axle 12 having mounted upon opposite ends thereof drive wheels 13. The rear axle structure 11 is provided on opposite sides of body portion 10 with bracket structures 14 and 15 affixed to the rear axle structure by bolts 16 and 17, and adapted for the attachment of an implement, indicated generally at 18. Plates 19 and 20 are bolted respectively to bracket structures 14 and 15, and the rearwardly extending ends thereof are affixed, as by welding, to a transversely extending bar 21 of square cross-section. Affixed to opposite ends of bar 21, through the intermediary of plates 22 welded to the bar, are vertically extending brackets 23 and 24. At intermediate spaced points along the bar and similarly affixed thereto are vertically extending brackets 25 and 26. Brackets 24 and 26 on the right-hand side of the bar 21 are provided with vertically spaced openings to receive for pivotal movement the inwardly turned legs 27 and 28 of a lifting bail 29, and the outwardly turned legs 30 and 31 of a vertically spaced lifting bail 32. Bails 29 and 32 extend rearwardly and are provided with parallel, transverse portions 33 and 34. A vertically extending tool-beam 35 is provided with spaced brackets 36 and 37 and at the lower end thereof is mounted a plow bottom 38. Transverse portion 33 of bail 29 is pivotally mounted in a sleeve 39 affixed to the bracket 36, and transverse portion 34 of bail 32 is pivoted in an opening in bracket 37. It is now apparent that, through the intermediary of lifting bails 29 and 32, working tool 38ª is pivotally connected to brackets 24 and 26 for vertical movement to and from working position.

The manner in which the working tools 38ª and 38ᵇ are moved to and from working position will now be described and, inasmuch as similar parts are employed for both tools, the description will be confined for convenience to working tool 38ª shown particularly well in Figures 1 and 2. At the upper end of bracket 26 is pivotally mounted a crank 40 having an upwardly projecting arm 41 and a rearwardly projecting arm 42. To the end of arm 42 is attached, as at 43, a chain 44, the lower end of which is connected to a member 45 affixed to the inner arm of lower bail 29. The upper end of arm 41 pivotally mounts the end of a forwardly extending link 46, which in turn is connected to a source of power, not shown, mounted on and deriving power from the tractor. By moving the link 46 in a forward direction, the crank 40 pivots about its connection to bracket 26 and causes the bails 29 and 32 carrying the working tool to move upwardly about their respective points of pivot on brackets 24 and 26.

At the upper end of bracket 26 is pivotally mounted a manually operable adjusting lever 47 adapted to work over a quadrant 48 affixed to bracket 24. The lever 47 is accessible to an operator's station 49 mounted on the tractor and is provided with a rearwardly extending arm 50, to the end of which is secured a depending chain 51, the lower end of which is attached to a member 52 affixed to the outer arm of bail 29. Lever 47 may be utilized to adjust the working depth of the working tool 38ª, and the working tool 38ᵇ on the left-hand side of the tractor is similarly equipped with a separate adjusting lever 53 and a lifting link 54 connected to a source of power on the left side of the tractor.

Referring now particularly to Figures 1 and 3, it will be noted that the only points of connection of the implement to the tractor are provided by the plates 19 and 20 bolted to attaching portions 14 and 15 and links 46 and 54. The implement is, therefore, readily detachable from the tractor as a unit, as shown in Figure 2. It is obvious, of course, that, upon detachment of the implement from the tractor with the plow bottom 38 resting upon the ground, the bails will tend to move downwardly about their pivotal connections to the tool-beam 35 and overbalance the implement. This pivotal movement of the bails with their supporting brackets is prevented by the provision of stop members 55, one for each working tool. Stop member 55 comprises a sleeve 56 affixed to bar 21, as by welding, and having a vertically extending member 57 slidably mounted therein. The lower end of member 57 is bent at right angles to provide an arm 58. The member 57 is axially rotatable and vertically adjustable in sleeve 56 and is held in its adjusted position by a set-screw 59. When the implement is attached to the tractor, the arm 58 is turned inwardly to the position indicated in Figure 3, but, when the implement is detached from the tractor, arm 58 is turned outwardly, as indicated in Figures 2 and 4. In this position, arm 58 contacts the inner arm of lower bail 29 at a point removed from its pivot on the bracket 26, as clearly shown in Figure 4. When the implement is attached to the tractor, the bails 29 and 32 are generally parallel and are approximately perpendicular to the tool-beam 35 and brackets 24 and 26, and the angle made by the bails with respect to the brackets is approximately a right angle. Upon detachment of the implement from the tractor, this relationship is maintained, and pivotal movement of the bails with respect to standard 35 is prevented by contact of stop member 55 with lower bail 29. Thus, the implement is not permitted to become unbalanced and attaching plates 19 and 20 remain at the same distance from the ground as when the implement is attached to the tractor. When it is desired to reattach the implement to the tractor, the tractor may be backed into the implement and attachment made with a minimum expenditure of time and labor.

In the modification shown in Figure 5, one of the outwardly bent legs 31' of bail 32', corresponding to bail 32 in Figures 1 to 4, is inserted in an opening in bracket 24' and is screw-threaded, as at 60, to accommodate opposed nuts 61 and 62 on opposite sides of the bracket. When the implement is attached to the tractor, one or both of the nuts 61 and 62 is loosened to permit free pivoting of bails with respect to the bracket 24'. When it is desired to detach the implement from the tractor, one of the nuts, for example nut 62, is tightened merely by a quick turn with a suitable wrench. Upon detachment of the implement from the tractor, the bails are thus prevented from pivoting. The angle of the bails with respect to the bracket and the tool bar is maintained by friction and the bails are not permitted to collapse. When such frictional holding device is utilized, the stop member 55 may be eliminated.

It should now be apparent that the novel mechanism herein described for rendering an agricultural implement self-supporting is particularly advantageous when applied to the type of implement which is connected to a support through the intermediary of parallel links or bails. The implement shown and described, when detached from the tractor or other support, is supported solely by contact of the working tool with the ground and is in position to be readily reattached to the tractor without lifting and without the necessity of employing the customary ground props and other auxiliary ground-contacting supports.

Having now described the invention, it should be understood that variations may be made in the number and arrangement of parts without departing from the spirit of the invention or the scope of the appended claim.

What is claimed is:

A self-supporting agricultural implement attachable as a unit to a tractor or other support comprising, in combination, a frame, a tool standard, ground-contacting tools attached to said standard and serving as the only support for said implement when detached from the tractor, vertically spaced, generally parallel link members pivoted at one end on said standard, means pivotally connecting the other ends of said members to the frame, said members occupying a certain angle with respect to said standard and said frame when the implement is attached to the tractor, and means spaced from the ground arranged to prevent pivoting of said members when said implement is detached from said tractor, said last-mentioned means comprising an adjustable stop affixed to said frame and arranged to abut against one of said members, whereby the angle occupied by said members with respect to said standard and said frame is maintained unimpaired.

JAMES L. HIPPLE.